C. TODD.
ATTACHMENT FOR VEHICLES.
APPLICATION FILED JULY 1, 1908.
912,759.
Patented Feb. 16, 1909.
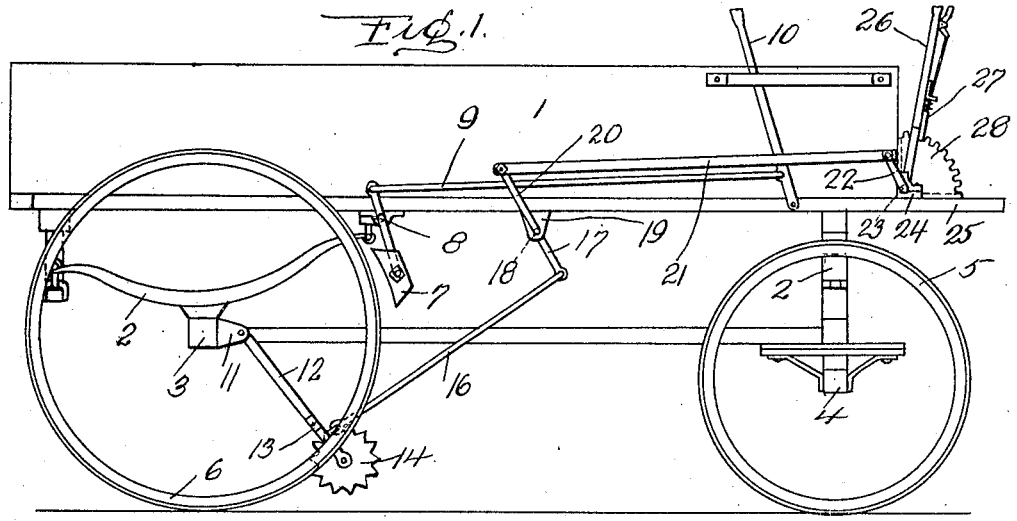
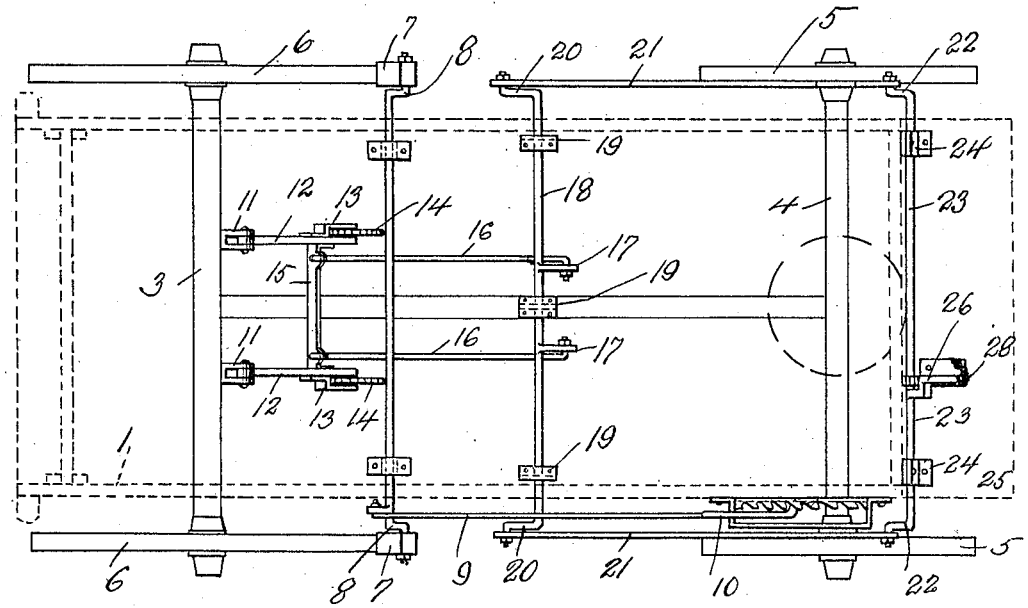
Witnesses
Samuel Payne
X. N. Butler
Inventor
Clyde Todd
By H. C. Everett
Attorneys

UNITED STATES PATENT OFFICE.

CLYDE TODD, OF PITTSBURG, PENNSYLVANIA.

ATTACHMENT FOR VEHICLES.

No. 912,759. Specification of Letters Patent. Patented Feb. 16, 1909.

Application filed July 1, 1908. Serial No. 441,396.

*To all whom it may concern:*

Be it known that I, CLYDE TODD, a citizen of the United States of America, residing at Pittsburg, in the county of Allegheny and State of Pennsylvania, have invented certain new and useful Improvements in Attachments for Vehicles, of which the following is a specification, reference being had therein to the accompanying drawing.

This invention relates to wagon brakes, and the primary object of my invention is to provide a brake that can be advantageously used in connection with heavy vehicles, said brakes being operated independent of the ordinary vehicle wheel-engaging brake.

Another object of this invention is to provide a simple and effective means for engaging the ground over which a vehicle passes for retarding the movement of the vehicle.

A still further object of this invention is to provide a strong and durable brake that will retard the movement of a vehicle passing over slippery surfaces.

With the above and other objects in view which will more readily appear as the invention is better understood, the same consists in the novel construction, combination and arrangement of parts to be presently described and then specifically pointed out in the appended claim.

In the drawings: Figure 1 is a side elevation of a vehicle equipped with my brake, and Fig. 2 is a bottom plan of the brake mechanism.

In the accompanying drawings, 1 designates the bed of a wagon supported by springs 2 above axles 3 and 4, these axles being provided with wheels 5 and 6. In connection with the wheel 6 ordinary brake shoes 7 are used, these shoes being moved through the medium of a crank shaft 8, connecting rod 9 and operating lever 10.

To equip the wagon with my improved brake mechanism I provide the rear axle 3 with bearings 11 for pivoted arms 12, said arms having brackets 13. Between the brackets 13 and the arms 12 are revolubly mounted toothed wheels 14. The arms 12 are connected together adjacent to their lower ends by a cross bar 15, and this bar is connected by links 16 to the cranks 17 of the shaft 18, said shaft being journaled in depending brackets 19 carried by the bed of the wagon. The outer ends of the crank shaft 18 are provided with cranks 20, and these cranks are connected by rods 21 to the cranks 22 of the crank shaft 23, said shaft being journaled in angular bearings 24 provided therefor upon the foot board 25 of the wagon.

Mounted upon the shaft 23 is an operating lever 26 provided with a spring-pressed locking pawl 27 adapted to engage a segment shaped rack 28, carried by the foot board 25. The operating lever 26 is located in proximity to the operating lever 10, whereby the driver of the vehicle can readily control both levers.

It is obvious that when the operating lever 26 is moved forward that the toothed wheels 14 are lowered into engagement with the surface over which the vehicle is traveling, this movement of the toothed wheels being accomplished by virtue of the crank shafts 23 and 18, connecting rods 9, links 21 and 16, and the pivoted arms 12.

While in the drawings forming a part of this application there is illustrated the preferred embodiments of my invention, I desire it to be understood that the elements therein may be varied or changed without departing from the spirit of the invention.

Having now described my invention what I claim as new, is:—

The combination with a vehicle bed having a foot board and supporting axles, of a pair of bearings secured to and projecting forwardly from the rear axle, a pair of forwardly extending and downwardly depending arms pivotally connected at their rear ends to said bearings and at their forward ends each provided with a bracket, toothed wheels revolubly mounted in said brackets and adapted to engage the surface over which said vehicle travels whereby the movement of the vehicle is arrested or retarded, a transversely extending bar connecting said arms together rearwardly of said brackets, keepers secured to the vehicle bed, a shaft revolubly supported by said keepers and having an inner and an outer pair of crank arms, said inner pair of crank arms normally extending forwardly and downwardly at an inclination and said outer pair of crank arms normally extending rearwardly and downwardly at an inclination, a pair of rearwardly and downwardly inclined links having the forward ends thereof bent in an angle and connected to the forward ends of said inner pair of crank arms, said links having their rear ends connected to said bar inwardly of the ends of said bar, a crank shaft revolubly supported upon said foot board, rods connecting said crank shaft to the outer pair of crank arms, an operating lever carried by the crank shaft, means in connection with said lever for retaining the same in a fixed position.

In testimony whereof I affix my signature in the presence of two witnesses.

CLYDE TODD.

Witnesses:
 JOE W. SHESNUT,
 K. H. BUTLER.